United States Patent
Lammers et al.

(10) Patent No.: US 11,845,062 B2
(45) Date of Patent: *Dec. 19, 2023

(54) METHOD FOR PRODUCING AN ADSORPTION AGENT FOR TREATING COMPRESSED GAS AND AN ADSORPTION DEVICE PROVIDED WITH SUCH AN ADSORPTION AGENT

(71) Applicant: ATLAS COPCO AIRPOWER, NAAMLOZE VENNOOTSCHAP, Wilrijk (BE)

(72) Inventors: Carlo Lammers, Wilrijk (BE); Steven Hans Rik Wouter Mullens, Mol (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 150 days.

This patent is subject to a terminal disclaimer.

(21) Appl. No.: 17/342,580

(22) Filed: Jun. 9, 2021

(65) Prior Publication Data

US 2021/0291147 A1 Sep. 23, 2021

Related U.S. Application Data

(63) Continuation of application No. 15/746,295, filed as application No. PCT/BE2016/000032 on Jul. 7, 2016, now Pat. No. 11,059,029.

(60) Provisional application No. 62/195,898, filed on Jul. 23, 2015.

(30) Foreign Application Priority Data

Nov. 6, 2015 (BE) .................... 2015/5724

(51) Int. Cl.
| | |
|---|---|
| *B01J 20/32* | (2006.01) |
| *B01D 53/02* | (2006.01) |
| *B01D 53/26* | (2006.01) |
| *B01J 20/28* | (2006.01) |
| *B01J 20/20* | (2006.01) |
| *B01J 20/22* | (2006.01) |
| *B01J 20/18* | (2006.01) |
| *B01J 20/16* | (2006.01) |
| *B01J 20/30* | (2006.01) |

(52) U.S. Cl.
CPC .......... *B01J 20/3295* (2013.01); *B01D 53/02* (2013.01); *B01D 53/261* (2013.01); *B01J 20/16* (2013.01); *B01J 20/18* (2013.01); *B01J 20/20* (2013.01); *B01J 20/226* (2013.01); *B01J 20/28042* (2013.01); *B01J 20/3021* (2013.01); *B01J 20/3078* (2013.01); *B01J 20/32* (2013.01); *B01J 20/3204* (2013.01); *B01J 20/3223* (2013.01); *B01J 20/3238* (2013.01); *B01D 2253/102* (2013.01); *B01D 2253/104* (2013.01); *B01D 2253/106* (2013.01); *B01D 2253/108* (2013.01); *B01D 2253/204* (2013.01); *B01D 2253/25* (2013.01); *B01D 2253/342* (2013.01); *B01D 2257/80* (2013.01)

(58) Field of Classification Search
CPC ........ B01J 20/3295; B01J 20/16; B01J 20/18; B01J 20/20; B01J 20/28042; B01D 53/02; B01D 53/261

See application file for complete search history.

(56) References Cited

U.S. PATENT DOCUMENTS

| | | | | |
|---|---|---|---|---|
| 2,930,445 | A ‡ | 3/1960 | Glass .................... | B01D 46/32 96/131 |
| 3,713,281 | A ‡ | 1/1973 | Asker ..................... | B01J 35/04 96/154 |
| 4,386,947 | A ‡ | 6/1983 | Mizuno .................. | B01D 53/02 123/519 |
| 5,288,306 | A ‡ | 2/1994 | Aibe ....................... | B01D 53/02 95/141 |
| 5,512,083 | A ‡ | 4/1996 | Dunne .................... | B01D 53/06 95/113 |
| 6,097,011 | A ‡ | 8/2000 | Gadkaree ........... | B01J 20/28042 219/553 |
| 6,139,609 | A ‡ | 10/2000 | Eimer ................... | B01D 53/261 96/117.5 |
| 6,558,457 | B1 ‡ | 5/2003 | Kolczyk .............. | B01D 53/261 55/318 |
| 6,814,771 | B2 ‡ | 11/2004 | Scardino ............ | B01D 53/0415 123/198 E |

(Continued)

FOREIGN PATENT DOCUMENTS

| | | | |
|---|---|---|---|
| CN | 103429339 | ‡ | 12/2013 |
| EP | 0157651 | | 10/1985 |

(Continued)

OTHER PUBLICATIONS

International Search Report on PCT/BE2016/000032 dated Jan. 4, 2017.‡
Indian Office Action in corresponding Indian Application No. 201837004124, dated Aug. 8, 2019.‡
EP Search Report in corresponding EP Application No. 20199982, dated Jan. 15, 2021.‡

(Continued)

*Primary Examiner* — Yong L Chu
(74) *Attorney, Agent, or Firm* — Bacon & Thomas, PLLC

(57) ABSTRACT

A method for manufacturing an adsorption agent for treating compressed gas, which includes the steps of providing a monolithic supporting structure; producing a coating suspension that includes an adsorbent; applying the coating suspension on the supporting structure to form a coating; applying a thermal treatment to the coated supporting structure in order to sinter the coating.

16 Claims, 1 Drawing Sheet

(56) References Cited

U.S. PATENT DOCUMENTS

| | | | |
|---|---|---|---|
| 7,300,905 B2 ‡ | 11/2007 | Keefer | B01D 53/02 502/439 |
| 7,722,705 B2 ‡ | 5/2010 | Gadkaree | B01D 53/64 95/134 |
| 7,909,919 B2 ‡ | 3/2011 | Kosugi | F02M 25/0854 96/126 |
| 8,882,874 B1 ‡ | 11/2014 | Cross | B01D 53/0407 55/482 |
| 9,339,754 B2 ‡ | 5/2016 | Davidian | B01D 53/047 |
| 11,059,029 B2 * | 7/2021 | Lammers | B01J 20/226 |
| 2001/0009124 A1 ‡ | 7/2001 | Suzuki | B01D 53/06 95/113 |
| 2004/0134171 A1 ‡ | 7/2004 | Scott | B01D 46/521 55/482 |
| 2004/0231179 A1 ‡ | 11/2004 | Kodama | B01D 53/261 34/79 |
| 2006/0208004 A1 ‡ | 9/2006 | Feather | B01J 37/0215 222/321.9 |
| 2008/0282888 A1 ‡ | 11/2008 | Deckman | B01D 53/0462 95/126 |
| 2011/0247312 A1 * | 10/2011 | Bookbinder | B01J 20/3204 428/116 |
| 2012/0090470 A1 ‡ | 4/2012 | McKenna | B01D 53/0415 96/147 |
| 2014/0305309 A1 ‡ | 10/2014 | McKenna | B01D 53/86 96/147 |
| 2015/0040765 A1 ‡ | 2/2015 | Zastera | B01J 20/20 96/117.5 |
| 2016/0096163 A1 ‡ | 4/2016 | House | B01J 20/18 95/141 |
| 2016/0236135 A1 ‡ | 8/2016 | Tammera | B01J 20/18 |

FOREIGN PATENT DOCUMENTS

| | | | |
|---|---|---|---|
| EP | 0157651 A2 ‡ | 10/1985 | ......... B01D 53/9454 |
| EP | 0428990 | 5/1991 | |
| EP | 0428990 A1 ‡ | 5/1991 | ......... C04B 41/4505 |
| EP | 2130578 | 12/2009 | |
| EP | 2130578 A1 ‡ | 12/2009 | ........... F01N 13/009 |
| EP | 2829318 | 1/2015 | |
| EP | 2829318 A1 ‡ | 1/2015 | ......... B01J 20/3238 |
| JP | 2000509354 A | 7/2000 | |
| JP | 2000509354 A ‡ | 7/2000 | |
| JP | 2005501668 | 1/2005 | |
| JP | 2005501668 A ‡ | 1/2005 | |
| RU | 66691 U1 ‡ | 9/2007 | |
| RU | 66691 U1 | 9/2007 | |
| RU | 2393002 ‡ | 6/2010 | |
| SU | 1279657 A1 | 12/1986 | |
| SU | 1279657 A1 ‡ | 12/1986 | |
| WO | 98/18541 | 7/1998 | |
| WO | WO-98/18541 ‡ | 7/1998 | |
| WO | 02066152 | 8/2002 | |
| WO | WO-02066152 A2 ‡ | 8/2002 | ......... B01J 20/28028 |
| WO | 2012118755 | 7/2012 | |
| WO | WO-2012118755 ‡ | 7/2012 | |

OTHER PUBLICATIONS

International Search Report dated Oct. 31, 2016 on PCT/BE2016/000026.‡

Andronikashivili et al. Russian Journal of Applied Chemistry, (2004), 77(12), p. 1939-1944.‡

\* cited by examiner
‡ imported from a related application

METHOD FOR PRODUCING AN ADSORPTION AGENT FOR TREATING COMPRESSED GAS AND AN ADSORPTION DEVICE PROVIDED WITH SUCH AN ADSORPTION AGENT

CROSS REFERENCE TO RELATED APPLICATIONS

This application is a continuation application of U.S. application Ser. No. 15/746,295, filed Jan. 19, 2018, now U.S. Pat. No. 11,059,029, which is the national stage entry of International Application PCT/BE2016/000032, filed Jul. 7, 2016, which claims priority to U.S. Provisional Application No. 62/195,898, filed Jul. 23, 2015, and to Belgian application BE 2015/5724, filed Nov. 6, 2015, which are all incorporated by reference.

The present invention relates to a method for manufacturing an adsorption agent for treating compressed gas, more specifically an adsorption agent that can be used for drying compressed gas, for example compressed air.

BACKGROUND OF THE INVENTION

Adsorption devices are already known in the form of drying devices for compressed gas, whereby these drying devices comprise a vessel in which a drying agent, or desiccant, is placed. The vessel concerned is provided with an inlet for supplying a compressed gas to be dried, and an outlet for removing dried gas.

The drying agent concerned is generally realised in the form of a regeneratable drying agent, or in other words a drying agent that can be regenerated after reaching a certain degree of saturation. It is indeed the case that as the drying agent extracts moisture from the gas to be dried, this drying agent will become increasingly saturated with adsorbed moisture. Hence, it is usual, after using the drying agent for a certain time to dry compressed gas, to regenerate this drying agent, for example by exposing it to a regeneration gas flow that extracts the moisture from the drying agent. Such a regeneration gas flow can consist of a fraction of the dried gas and/or hot gas for example whose relative humidity is sufficiently low to be able to realise the regeneration of the drying agent.

In some embodiments of drying devices for compressed gas, use is made of two or more vessels of drying agent. With two vessels this principle of drying device is also referred to as a twin tower dryer. In such a type of drying device a compressed gas, for example originating from a compressor, can be passed through the first of the aforementioned vessels for example, where it will be dried by the drying agent in the vessel concerned, after having passed through an after cooler and a condensate separator (which may or may not form part of the after cooler concerned). This vessel consequently acts as a drying vessel.

At the same time, a regeneration gas flow can be guided through a second aforementioned vessel in order to regenerate the drying agent in that second vessel by extracting the moisture from this drying agent. This can be done by making use of a gas that has already been dried, for example, that is tapped off downstream from the drying vessel for example and/or by supplying a gas flow that has been heated, for example by recovering the heat generated in the compressor during the compression. In this last case it is called a "heat of compression" or HOC dryer.

When the drying agent in the drying vessel has reached a certain degree of saturation, the gas flows through the first and the second vessel can be changed over, such that the drying agent in the first vessel will now be regenerated by a regeneration gas flow while the second vessel will take on the role of drying vessel. In this way the two or more vessels will alternately operate as a drying pressure vessel and a regenerating pressure vessel, such that continuity in the drying process can be realised. Examples of such drying devices with a number of vessels are described for example in US 2003/023.941, U.S. Pat. Nos. 4,783,432, 6,375,722, EP 1.776.171 and WO 2006/050.582.

The drying agent that is used in such drying devices with a number of vessels often consists of grains of silica gel, activated alumina or a molecular sieve material, or a combination thereof. As is known activated alumina is produced by thermal dehydration or activation of aluminium hydroxide $Al(OH)_3$, while molecular sieves consist of synthetic zeolites (crystalline aluminosilicates).

A limitation of such a type of drying device that comprises a drying agent in a granular form, consists of the gas speeds through the vessels having to be limited in order to counteract grains moving against one another or even fluidisation. Indeed, due to the grains being set in motion friction will occur between them, which in turn leads to dust formation and a reduced drying capacity. Other causes of such dust formation are for example pressure variations and/or thermal shocks. Moreover, the pressure drop across a twin tower dryer is relatively high and the desiccant grains have a rather high thermal mass.

Alternative drying devices are known for compressed gas, whereby the drying agent is placed in a rotating drum, while a drying zone and regeneration zone extend in the vessel. During the operation of such a drying device, the drying drum will be made to rotate by drive means provided to this end, such that the drying agent in this drying drum will alternately be taken through the drying zone and the regeneration zone. The compressed gas to be dried will be guided through the drying zone, while the regeneration gas flow is guided through the regeneration zone, in order to realise simultaneous drying of compressed gas in the drying zone and regeneration of the drying agent in the regeneration zone.

Examples of such drying devices that are provided with a rotating drying drum are described for example in WO 00/033.943, WO 00/074.819, WO 01/078.872, WO 01/087.463, WO 02/038.251, WO 2007/079533, WO 2005/070.518, WO 2006/012.711, GB 1.226.348, GB 1.349.732, GB 1.426.292, U.S. Pat. Nos. 3,490,201, 5,385,603 and 8,349,054.

The drying agent or desiccant that is used in the known drying devices for drying compressed gas consists of silica gel, molecular sieves, activated alumina or a combination thereof, for example. As is known, the drying agent can be affixed on a support such as a corrugated structure of glass fibres or ceramic fibres that are rolled up for example to form a honeycomb structure in the vessel, for example as described in U.S. Pat. No. 5,683,532.

In practice it turns out that with the known drying devices for drying compressed gas, under certain conditions such as in the event of insufficient regeneration of the drying agent and oversaturation thereof, the drying agent goes through a complex breakdown process that in some cases can ultimately result in the failure of the drying device, for example in the case of silica gel as a drying agent in a rotor, because the binder function of the silica gel decreases, which leads to a loss of structural strength of the supporting glass fibre matrix, and also because the adsorbing function of the silica gel decreases as a result of hydrolisation and breakdown of the silica gel structure.

Thus the adsorption behaviour and adsorption capacity of a silica gel rotor, in heavy conditions of high moisture and high temperature will substantially change during the useful life of the rotor.

SUMMARY OF THE INVENTION

The purpose of the present invention is to provide a method for manufacturing an improved adsorption agent for treating compressed gas, whereby this adsorption agent provides a solution to one or more of the disadvantages attached to the conventional, known adsorption agents.

To this end the invention concerns a method for manufacturing an adsorption agent for treating compressed gas, whereby this method comprises the following steps:
  the provision of a monolithic supporting structure;
  the production of a coating suspension that comprises an adsorbent;
  the application of the aforementioned coating suspension on the aforementioned supporting structure to form a coating;
  the application of a thermal treatment to the supporting structure with the coating, in order to sinter the coating.

An advantage of the adsorption agent obtained with this method is that there is no risk of grains moving against one another or even fluidisation of such an adsorption agent during use in an adsorption device for treating compressed gas, as loose grains of adsorption agent are not used. As a result dust formation is prevented, while a relatively high flow speed of the compressed gas to be dried through the drying device is possible.

In addition the drying agent thus obtained enables it to be affixed in a drying device in whatever spatial orientation during use, such as vertical, sloping or even horizontal, which is not possible with conventional drying agents that are granular, as the horizontal use of such granular drying agents can lead to a rearrangement of the grains and the formation of internal leakage paths and consequently reduced dryer performance.

According to a preferred characteristic of the invention, the aforementioned monolithic supporting structure comprises one or more of the following materials: ceramic material, metal foil, a fibre structure and a polymer. Particularly good results are obtained with the use of a ceramic structure that contains cordierite.

Preferably the aforementioned adsorbent contains one or more of the following materials: a zeolite, silica gel, activated alumina, activated carbon, metal organic frameworks, carbon molecular sieve (CMS), an impregnated adsorbent and a hybrid. In particular a hydrophilic zeolite support is preferable. Good results are obtained by making use of faujasite zeolite type X, in which the silicon/aluminium ratio is between 2 and 3.

The present invention also relates to an adsorption agent obtained with the method according to claim 1, whether or not in combination with the characteristics of one or more of the claims following on from it.

The invention also relates to an adsorption device for drying compressed gas, whereby this adsorption device comprises an adsorption agent obtained with the method according to the invention.

BRIEF DESCRIPTION OF THE DRAWINGS

With the intention of better showing the characteristics of the present invention, a few preferred variants of a method according to the invention for manufacturing an adsorption agent for treating compressed gas are described hereinafter by way of an example, without any limiting nature, with reference to the accompanying drawings, wherein.

DETAILED DESCRIPTION OF THE INVENTION

Figure 1:
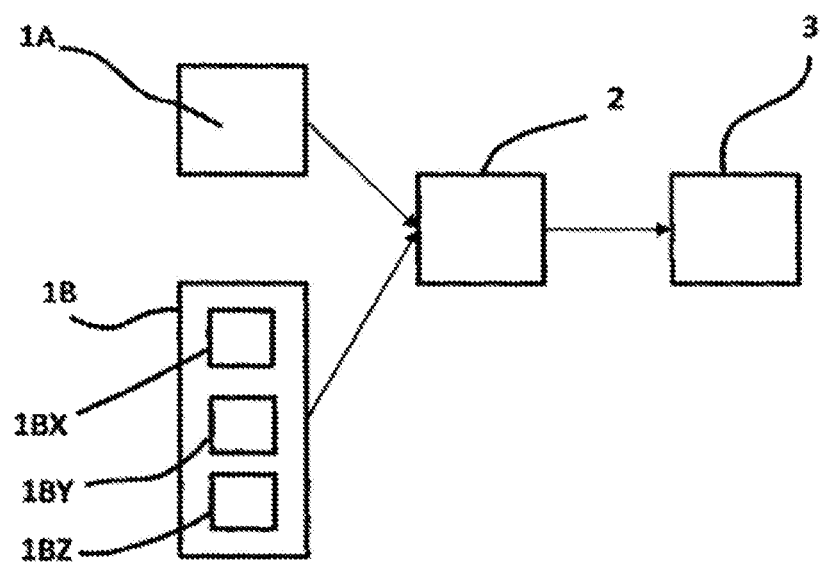
FIG. 1 schematically shows a possible embodiment of a method according to the invention for manufacturing an adsorption means.

FIG. 1 shows a block diagram whereby each block presents a step of the method according to the invention and whereby in some blocks a number of sub-steps are distinguished between.

Essentially the method according to the invention for the manufacture of an adsorption agent for treating compressed gas consists of a step 1A of providing a monolithic supporting structure and a step 1B consisting of the production of a coating suspension that contains an adsorbent.

In the next step 2 the aforementioned coating suspension is applied to the aforementioned supporting structure to form a coating and, finally, in step 3 a thermal treatment is applied to the resulting supporting structure with the coating obtained after step 2, in order to sinter the aforementioned coating in order to finally obtain an improved adsorption agent.

According to a preferred, but not necessary, characteristic of the invention a ceramic structure that contains cordierite, for example Celcor© by Corning, is selected for the monolithic supporting structure.

Alternatively, according to the invention, other materials can also be used for the manufacture of the supporting structure concerned, such as:
  other ceramic materials such as mullite, γ- or α-alumina or silicon carbide (SiC);
  metal foil;
  a fibre structure, for example based on glass fibre, ceramic fibre or other fibres, or a mixture of different types of fibres; or
  a polymer.

It goes without saying that the aforementioned list is not exhaustive and the use of other materials is not excluded.

According to the invention, it is not excluded either that the monolithic supporting structure is made of a combination of two or more of the aforementioned and/or other materials.

According to a preferred characteristic of the invention the material from which the supporting structure is made preferably contains between 200 and 1200 CPSI (cells per square inch), and more preferably between 350 and 450 CPSI.

The wall thickness of the supporting structure is preferably between 2 and 11 mil (milli-inch), and more preferably between 3 and 9 mil, and even more preferably between 5 and 7.5 mil. In a most preferred embodiment, the wall thickness is between 6 and 7 mil, preferably approximately 6.5 mil.

The porosity of the wall of the supporting structure is preferably greater than 5%, and more preferably greater than 10%, and even better greater than 20%.

The cells formed preferably have a square shape, but can present other shapes such as triangular, sinusoidal, circular, hexagonal and similar.

Step 1B of the production of the coating suspension preferably comprises the following sub-steps:
- a first sub-step 1BX of providing a solvent;
- a second sub-step 1BY of the addition of an adsorbent to the aforementioned solvent to form a mixture; and
- a third sub-step 1BZ of the addition of a binder material to the aforementioned mixture.

In sub-step 1BY preferably one or more of the following and/or other materials are selected as an adsorbent:
- a zeolite, preferably a hydrophilic zeolite, but a hydrophobic zeolite is also possible—this zeolite can be faujasite zeolite type X for example, for example Zeolum F9 of Tosoh, or a mixture of zeolite type X and A;
- silica gel;
- activated alumina;
- activated carbon;
- metal-organic frameworks;
- carbon molecular sieve (CMS);
- an impregnated adsorbent; and
- a hybrid adsorbent.

The above list is not exhaustive and other materials are also possible according to the invention. The choice of adsorbent depends on what treatment the gas to be treated must go through, such as drying or the selective removal of other molecules such as oxygen or carbon dioxide for example, when using the adsorption means in a nitrogen generator or similar, whereby the gas to be treated can be compressed air for example.

The distribution of the particle size of the adsorbent is preferably such that $D_{50}$ is less than 10 μm and more preferably less than 4 μm.

The aforementioned binder material that is added in the third sub-step 1BZ preferably contains an inorganic binder material such as:
- colloidal silica, for example Ludox-AS 40 of Grace Davison;
- alumina; and/or
- clay.

Moreover, if need be use can be made of an organic binder material such as:
- methyl cellulose;
- polymers such as acrylic resins, vinyl resins and similar; and/or
- a material from the cellulose group.

According to a possible characteristic of the invention, step 1B of the production of the coating suspension comprises the addition of one or more additives, such as an additive to affect the acidity (pH value), for example hydrogen chloride (HCl) to decrease the pH or ammonia ($NH_3$) to increase the pH, and/or an additive to counteract foam formation. For example, but not strictly necessary, the pH value is brought between 9 and 11 and more preferably between 9.5 and 10.5.

The second sub-step 1BY of the addition of an adsorbent to the aforementioned solvent to form a mixture preferably comprises:
- the introduction of the adsorbent in powder form into the solvent
- the mixing of the adsorbent and the solvent during or after the introduction of the adsorbent in the solvent.

According to an additional preferred aspect of the invention, after mixing the adsorbent in the solvent, the adsorbent particles are reduced in size in order to obtain the aforementioned preferred particle size, for example by wet milling. Examples of wet milling are attrition milling, roll milling or immersion milling.

The coating suspension obtained after step 1B is preferably a shear thinning liquid, which upon the action of shear stress presents a reduced viscosity.

Step 2 of the method according to the invention, consisting of the application of the aforementioned coating suspension on the aforementioned supporting structure, preferably consists of flushing or perfusing the supporting structure with the coating suspension concerned.

Preferably the perfusion of the supporting structure is done from bottom to top or in other words in the opposite direction to gravity, for example by pumping means provided to this end that either pump the coating suspension upwards through the supporting structure or sucks up the coating suspension through the supporting structure, preferably until all channels through the supporting structure have been filled with coating material.

Then the pumping means can be switched off in order to let the surplus coating material flow out of the channels. Alternatively the operating direction of the pumping means concerned can be reversed such that an active evacuation of surplus coating material from the channels is obtained.

According to a particular preferred aspect of the invention, a part of the surplus coating material can be evacuated from the supporting structure by applying one or more pressure pulses of a purge gas through the channels of the supporting structure. An example of such a purge gas is air.

Good results are obtained in particular when using a shear thinning coating suspension with such active evacuation of the channels in the supporting structure.

After any removal of surplus coating material the coated supporting structure may be left to dry, for example in ambient conditions, until the solvent has largely evaporated. When water is used as a solvent, for example, this drying can be done in the surrounding air.

In a last step 3 of the method according to the invention the resulting supporting structure with coating, as obtained after step 2, is subject to a thermal treatment in order to sinter the coating.

During this thermal treatment the aforementioned resulting supporting structure is exposed to a temperature of preferably more than 400° C., and even more preferably more than 500° C., and in a most preferred embodiment a temperature of 550° C.

Of course numerous variant temperature variations may be applied during this thermal treatment. A non-limiting example is shown in FIG. 2, whereby the horizontal axis shows the time expressed in hours, while the vertical axis indicates the temperature expressed in degrees Celsius.

At the start time $t_0$ of step three, the temperature is equal to the ambient temperature, in this example 20° C. The temperature is raised slowly, in this case at a rate of 50° C. per hour, and in this example for a period of 10 hours 36 minutes. At time $t_1$, i.e. 10 hours and 36 minutes after time $t_0$, in this case the temperature will consequently have risen to 550° C.

Preferably the period of increasing temperature is followed by a period in which the temperature is kept constantly high, preferably above 400° C. and better above 500° C. In this non-exhaustive example the time interval in which the temperature is kept high is 1 hour. At the end of this time interval in which in this example the temperature is kept at 550° C. for 1 hour, the temperature will be reduced again, in this example at a higher rate than the temperature increase at the beginning of the heat treatment. The temperature can be decreased for example at a rate of 150° C. per hour, which in the example shown means that the time interval between $t_2$ at the end of the period in which the temperature is kept practically constantly high, and $t_3$ at the end of the temperature decrease to ambient temperature (in this example 20° C.), is only 3 hours and 32 minutes.

Figure 2:
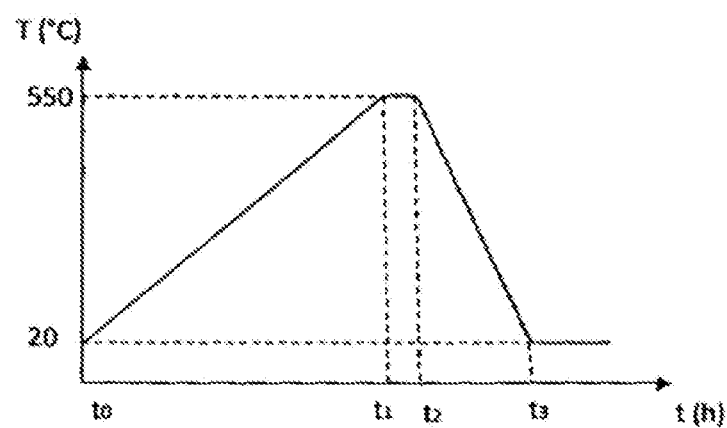
FIG. 2 shows a possible temperature variation that could be applied in a method according to the invention.

Starting with an ambient temperature of 20° C. and by adhering to the temperature variations as shown in FIG. 2 by way of a non-limiting example, the entire step 3 of the heat treatment will thus take 15 hours and 8 minutes.

As a method according to the invention yields a coating material with a very high mass density of adsorbent material and with a very good adhesion to the supporting structure (250 kg per cubic metre or more), such an adsorption agent obtained with the method according to the invention is extremely suitable for application in a drying device for drying compressed gas, as the increased dryer efficiency even enables the flow rate of gas to be dried that is guided through the drying device to be tripled. In other words, for the same flow rate of gas to be dried, a substantially smaller drying device can be used, which presents important ecological and economic benefits.

In order to be able to make the layer thickness bigger, according to a preferred aspect of the invention, the steps of applying the coating suspension and the thermal treatment of the whole of the supporting structure with the coating thereon is repeated one or more times, until the desired coating thickness on the supporting structure is reached.

The invention relates to a method for manufacturing an adsorption agent, either in the form of a drying agent for the adsorption of moisture or in the form of a different adsorption agent that can be used for selective adsorption, for example, such as in nitrogen generators or similar, because the adsorption agent is able to adsorb certain gas molecules such as oxygen, carbon dioxide and similar. By removing such gas molecules from compressed air for example, as is known, nitrogen can be generated.

The present invention is by no means limited to the embodiments described as an example and shown in the drawings, but a method according to the invention for manufacturing an adsorption agent can be realised in many ways, without departing from the scope of the invention.

The invention claimed is:

1. A gas compressor system comprising:
   an air compressor; and
   an adsorption device provided with an adsorption agent obtained with a method comprising the following steps:
   providing a monolithic supporting structure, wherein the monolithic supporting structure contains between 200 and 1200 cells per square inch (CPSI);
   choosing an adsorbent based on a treatment for drying the compressed gas from a compressed gas system, wherein the adsorbent is at least a drying agent that adsorbs moisture in the compressed gas from the compressed gas system;
   producing a coating suspension that comprises the adsorbent, wherein for the production of the coating suspension the adsorbent is selected which comprises a zeolite;
   applying the coating suspension on the supporting structure to form a coating;
   applying a thermal treatment to the supporting structure with the coating, in order to sinter the coating;
   wherein the applying the coating suspension on the supporting structure comprises the step of flushing or perfusing the supporting structure with the coating suspension;
   wherein the perfusion of the supporting structure is done from bottom to top in the opposite direction to gravity;
   wherein the perfusion is realized by a pump that pumps the coating suspension upwards through the supporting structure; and
   wherein coating material is removed after the perfusion of the supporting structure with coating suspension.

2. A method for manufacturing an adsorption agent comprising the following steps:
   choosing an adsorbent based on a treatment for drying compressed gas, wherein the adsorbent is at least a drying agent that adsorbs moisture in the compressed gas from a compressed gas system;
   producing a coating suspension that comprises the adsorbent, wherein the adsorbent comprises a zeolite;
   applying the coating suspension to a supporting structure to form a coating; and
   sintering the coating by a thermal treatment;
   wherein said applying comprises perfusing the supporting structure with the coating suspension, said perfusing is done in the opposite direction to gravity, and said perfusing is realized by a pump that pumps the coating suspension upwards through the supporting structure; and further comprising
   removing a portion of the coating material after the perfusing.

3. A method for drying a compressed gas from an air compressor comprising the steps of:
   manufacturing an adsorption agent according to claim 2;
   providing the adsorption agent in a drying device comprising at least two vessels;
   drying the compressed gas from a compressed air compressor by guiding the compressed gas through the drying device,
   wherein a drying efficiency of the drying device is increased at least three folds using the adsorption agent.

4. The method according to claim 2, wherein for the production of the coating suspension one or more of the following materials are selected for an adsorbent: a zeolite, silica gel, activated alumina, activated carbon, metal-organic frameworks, carbon molecular sieve (CMS), an impregnated adsorbent and a hybrid adsorbent.

5. The method according to claim 2, wherein the adsorbent comprises faujasite zeolite type X.

6. The method according to claim 2, wherein the step of producing the coating suspension comprises the following sub-steps:
   providing a solvent;
   adding the adsorbent to the solvent to form a mixture; and
   adding a binder material to the mixture.

7. The method according to claim 6, wherein after the addition of the adsorbent to the solvent and the mixing of the adsorbent with the solvent, the adsorbent particles are reduced in size by wet milling.

8. The method according to claim 7, wherein the particle size of the adsorbent is reduced in size until $D_{50}$ is less than 10 μm.

9. The method according to claim 6, wherein one or more of the following inorganic binder materials are selected as a binder material:
   colloidal silica;
   alumina; and/or
   clay.

10. The method according to claim 6, wherein one or more of the following organic binder materials are selected as a binder material:
    methyl cellulose;
    polymers such as acrylic resins, vinyl resins and similar; and/or
    a material of the cellulose group.

11. The method according to claim 2, wherein said removing comprises applying one or more pressure pulses of a purge gas through a channel of the supporting structure.

12. The method according to claim 2, wherein the thermal treatment comprises three phases:
   increasing the temperature during the first time interval $t_1$-$t_0$;
   keeping the temperature constantly high at a value above 400° C. during a second time interval $t_2$-$t_1$;
   decreasing the temperature back to ambient temperature during a third time interval $t_3$-$t_2$.

13. The method according to claim 12, wherein the temperature is kept constant during the second time interval $t_2$-$t_1$.

14. The method according to claim 2, wherein the step of producing the coating suspension comprises the addition of one or more additives.

15. The method according to claim 14, wherein the one or more additives contain one or more of the following agents:
   an additive to affect the acidity (pH value); and
   an additive to counteract foam formation.

16. The method according to claim 15, wherein the additive to affect the acidity consists of hydrogen chloride or ammonia.

* * * * *